(12) United States Patent
Stubbs et al.

(10) Patent No.: US 8,347,149 B2
(45) Date of Patent: Jan. 1, 2013

(54) SYSTEM AND METHOD FOR PROVIDING FAULT TOLERANT PROCESSING IN AN IMPLANTABLE MEDICAL DEVICE

(75) Inventors: Scott R. Stubbs, Maple Grove, MN (US); Conrad L. Sowder, Minneapolis, MN (US); Kenneth P. Hoyme, Plymouth, MN (US); William J. Linder, Golden Valley, MN (US); Hiten J. Doshi, Plymouth, MN (US); Lynn S. Elliott, Maple Grove, MN (US)

(73) Assignee: Cardiac Pacemakers, Inc., St. Paul, MN (US)

( * ) Notice: Subject to any disclaimer, the term of this patent is extended or adjusted under 35 U.S.C. 154(b) by 175 days.

(21) Appl. No.: 12/568,652

(22) Filed: Sep. 28, 2009

(65) Prior Publication Data
US 2010/0088539 A1   Apr. 8, 2010

Related U.S. Application Data

(60) Provisional application No. 61/101,968, filed on Oct. 1, 2008.

(51) Int. Cl.
G06F 11/00 (2006.01)
(52) U.S. Cl. ......... 714/47.1; 714/38.1; 718/102; 607/27
(58) Field of Classification Search ............. 714/38.1, 714/38.12, 51, 55, 47.1, 47.2, 47.3; 718/102, 718/107; 717/127; 607/27
See application file for complete search history.

(56) References Cited

U.S. PATENT DOCUMENTS

| | | | |
|---|---|---|---|
| 4,410,938 A | 10/1983 | Higashiyama | |
| 4,683,532 A | 7/1987 | Yount | |
| 4,920,538 A | 4/1990 | Chan et al. | |
| 5,740,360 A | 4/1998 | Huckstepp | |
| 6,336,903 B1 | 1/2002 | Bardy | |
| 6,368,284 B1 | 4/2002 | Bardy | |
| 6,398,728 B1 | 6/2002 | Bardy | |
| 6,411,840 B1 | 6/2002 | Bardy | |
| 6,440,066 B1 | 8/2002 | Bardy | |
| 6,571,363 B1 | 5/2003 | Steiss | |
| 6,587,967 B1 | 7/2003 | Bates et al. | |
| 6,892,331 B2 * | 5/2005 | Da Palma et al. | 714/55 |
| 7,069,543 B2 * | 6/2006 | Boucher | 717/127 |
| 7,223,234 B2 * | 5/2007 | Stupp et al. | 600/300 |
| 7,483,744 B2 | 1/2009 | Stubbs et al. | |
| 7,848,819 B2 * | 12/2010 | Goetz et al. | 607/59 |
| 2006/0253163 A1 * | 11/2006 | Stubbs et al. | 607/27 |
| 2007/0169125 A1 * | 7/2007 | Qin | 718/102 |

\* cited by examiner

*Primary Examiner* — Scott Baderman
*Assistant Examiner* — Joseph Kudirka
(74) *Attorney, Agent, or Firm* — Pauly, Devries Smith & Deffner, L.L.C.

(57) ABSTRACT

Embodiments herein generally relate to implantable medical devices and, specifically, to a system and method for providing fault tolerant processing in an implantable medical device. In an embodiment a system for providing fault tolerant processing in an implantable medical device is provided. The system can include an implantable medical device comprising a processor and memory store configured to execute a plurality of threads, temporal and spatial constraints assigned to one or more of the threads, and a kernel. The kernel can include a scheduler and a thread monitor configured to monitor execution of threads against the temporal and spatial constraints, and further configured to issue a response upon violation of either of the constraints by one of the plurality of threads. In an embodiment a method for providing fault tolerant processing in an implantable medical device is provided. Other embodiments are also included herein.

17 Claims, 5 Drawing Sheets

SYSTEM AND METHOD FOR PROVIDING FAULT TOLERANT PROCESSING IN AN IMPLANTABLE MEDICAL DEVICE

This application claims the benefit of U.S. Provisional Application No. 61/101,968, filed Oct. 1, 2008, the content of which is herein incorporated by reference in its entirety.

FIELD

Embodiments herein generally relate to implantable medical devices and, specifically, to a system and method for providing fault tolerant processing in an implantable medical device.

BACKGROUND

Fully implantable medical devices (IMDs), such as cardiac rhythm management (CRM) devices, are expected to function reliably and autonomously over an extended time period. CRM devices include pacemakers, which manage bradycardia by delivering pacing stimuli to restore normal sinus rhythm, and implantable cardioverter defibrillators (ICDs), which treat tachycardia through high-energy cardioversion, defibrillation shocks, or anti-tachycardia pacing.

Ensuring continuity of life-sustaining therapy in these devices, such as providing endocardial electrical stimuli in response to sensed cardiac arrhythmias, is critical. IMDs operate in real time on an event driven basis. Different event types must be processed, including asynchronous sensing tasks and reporting requests, and periodic therapy functions, such as cardiac pacing, that require an IMD to process interrupts on a tightly controlled timeline. Although disruption of asynchronous event processing can be tolerated to some extent, unexpected interruption or cessation of core periodic therapeutic function is unacceptable.

Core IMD operations have increasingly been supplemented with ancillary functions, such as physiometric and environmental monitoring. The wider range of functions, though, challenges robust IMD operation. IMD architectures have been migrating towards a programmable control model that utilizes a microprocessor with memory store, which enables functional expansion through built-in or downloaded programming. As well, increases in onboard memory have enabled tracking of more data types, while radio frequency (RF) telemetry has increased bandwidth for data exchange and improved reporting frequency.

These changes to IMD functionality have increased the risk of malfunction or failure due to design or programmatic errors and other faults. Conventional IMD design places primary reliance on a uniprocessor operating on a shared pool of memory under programmed control. Multithreaded operation is increasingly available to support periodic and asynchronous operations. Multithreading, however, creates the risk that problems in one execution thread, including system-on-chip (SOC) process faults, firmware design flaws, and runtime errors, such as single-event upsets, cross thread execution, memory corruption, and process deadlock, could adversely affect other, possibly critical core, functions.

As a result, timely IMD recovery is crucial. One conventional approach employs monitoring programs, known as watchdog timers, often implemented as hardware timing devices. Executing processes must regularly issue a service pulse. The absence of a service pulse implies a fault condition, which will trigger a system reset. In a multithreaded environment, the watchdog timer service interval is set to exceed the longest expected execution thread and thereby avoid false detection of long running execution threads. An overlong service interval, however, can miss detection of cross thread execution, instruction missequencing, and similar errors. Conventional solutions fail to resolve this problem.

SUMMARY

A system and method for thread monitoring within an implantable medical device includes assigning temporal and spatial constraints to each thread. The constraints can be assigned at compile time or runtime, either to individual threads or classes of threads. The temporal constraints provide an upper bound on allowable thread execution time. The spatial constraints ensure a completed thread has stayed within the bounds of allotted memory. A thread monitor oversees the execution of the threads. Non-termination within the allotted time indicates a timing error. The thread monitor also compares a unique thread identifier provided by a completed thread against a stored thread identifier. Mismatch of the thread identifiers indicates an instruction error. Corrective action, such as device reset or reboot, is taken as appropriate when a timing or instruction fault is identified.

One embodiment provides a system and method for providing fault tolerant processing in an implantable medical device. A processor and memory store are provided in an implantable medical device. Temporal and spatial constraints are defined for one or more processes. Separate threads of execution are scheduled on the processor to the processes. On-going execution by the processor and continuing memory usage in the memory store of each execution thread is monitored respectively against the temporal and spatial constraints. A response is issued upon violation of either of the constraints by one such execution thread.

Still other embodiments will become readily apparent to those skilled in the art from the following detailed description, wherein are described embodiments by way of illustrating the best mode contemplated. As will be realized other and different embodiments are possible and their several details are capable of modifications in various obvious respects, all without departing from the spirit and the scope. Accordingly, the drawings and detailed description are to be regarded as illustrative in nature and not as restrictive.

DETAILED DESCRIPTION

In Situ Environment

Figure 1:
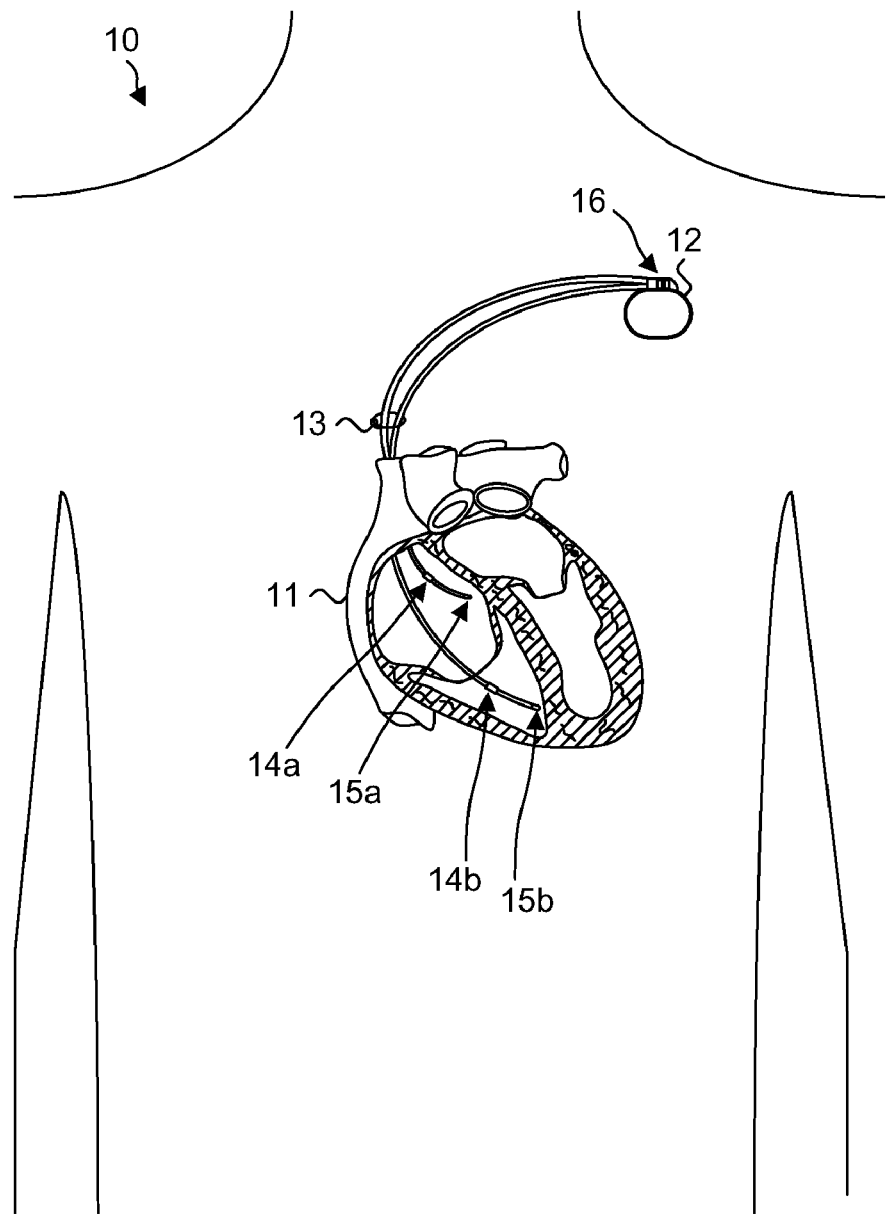
FIG. 1 is a block diagram showing, by way of example, an implantable medical device in situ.

Advances in microelectronics have increased the scope of functionality provided by IMDs, particularly CRM devices, which increasingly include a range of ancillary functions, such as physiometric and environmental monitoring and extended data reporting capabilities. FIG. 1 is a block diagram showing, by way of example, an implantable medical device 12 in situ. IMDs include pacemakers, implantable cardioverter-defibrillators, biventricular pacemakers, implantable sensors, neural stimulators, and implantable monitors, as well as IMD of other types. Moreover, although described in relation to medical devices intended for providing cardio and cardiopulmonary patient care, the embodiments described apply generally to all manner of implantable medical devices and sensors for medical care, whether monitoring, diagnostic, or therapeutic.

By way of example, the IMD 12 is surgically implanted in the chest, abdomen, or other location wholly within the body of a patient 10. The IMD 12 includes a standardized coupling 16 to which endocardial pacing leads 13 are proximally connected. The IMD 12 encloses operational circuitry, as further described below with reference to FIG. 2, within a hermetically-sealed housing and is interfaced to the endocardial pacing leads 13 via the standardized coupling 16. The endocardial pacing leads 13 provide physiometric monitoring from within and deliver therapeutic electrical stimuli to the patient's heart 11. Physiometry is directly measured through sensors 14a, 14b and electrical stimuli is delivered through electrodes 15a, 15b, which are each provided on the distal end of each pacing lead 13.

The IMD 12 records patient data for use in determining the need for therapy delivery and for subsequent upload during interrogation. The patient data includes physiometry monitored through the sensors 14a, 14b; observed environmental data, for instance, ambient temperature or time of day; and parametric information, including program code and parameters, device status, and operational characteristics. Other forms of patient data are possible.

The IMD 12 can be interrogated by an external interrogation device, such as an in-clinic programmer or patient-operable interrogation device, such as a repeater, on a regular basis or on demand. During each interrogation session, the external interrogation device retrieves recorded patient data from the IMD 12 and may optionally download programming, which can include revised operational parameters, programmatic patches to existing code, or new functionality to change how the device operates. Device interrogation can occur regularly per a schedule on a monthly, weekly, or daily basis, or as frequently as appropriate or practical, or on demand under patient or attendant control. The external interrogation device can either store the retrieved patient data locally, or can forward the patient data to a centralized repository for further analysis or storage.

In a further embodiment, the patient data can be evaluated, either by the IMD 12, the external interrogation device, a server coupled to the centralized repository, or other device, for the occurrence of one or more chronic or acute health conditions, such as described in related, commonly-owned U.S. Pat. No. 6,336,903, to Bardy, issued Jan. 8, 2002; U.S. Pat. No. 6,368,284, to Bardy, issued Apr. 9, 2002; U.S. Pat. No. 6,398,728, to Bardy, issued Jun. 4, 2002; U.S. Pat. No. 6,411,840, to Bardy, issued Jun. 25, 2002; and U.S. Pat. No. 6,440,066, to Bardy, issued Aug. 27, 2002, the disclosures of which are incorporated by reference.

In a still further embodiment, the patient data is extracorporeally safeguarded against unauthorized disclosure to third parties, whether during collection, assembly, evaluation, transmission, or storage, to protect patient privacy and comply with medical information privacy laws, such as the Health Insurance Portability and Accountability Act (HIPAA) and the European Privacy Directive. At a minimum, patient health information that identifies a particular individual with health- and medical-related information is treated as protectable, although other types of sensitive information in addition to or in lieu of specific patient health information could also be protectable.

Physical Components

Figure 2:
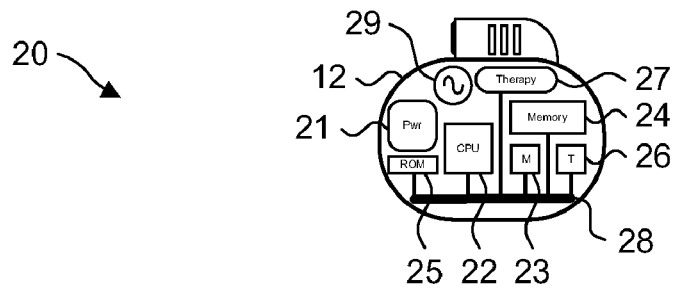
FIG. 2 is a block diagram showing the physical components of an implantable medical device.

Structurally, IMD functionality can be provided through the operational circuitry, which can include dedicated hardwired circuitry or, more generally, a microprogrammed computer architecture consisting of a centralized processor coupled to a digital memory store. FIG. 2 is a block diagram showing the physical components 20 of an IMD 12. The IMD 12 is structured with a von Neumann architecture. However, other forms of component architecture, including a Harvard architecture, are possible.

Generally, the physical components 20 of an IMD includes a central processing unit (CPU) or simply "processor" 22, memory management unit (MMU) 23, random access memory ("memory") 24, read-only memory ("ROM") 25, transducer circuitry 26, and therapy control circuitry 27 interconnected over a common bus 28, plus ancillary physical components, including a power source 21, oscillator 29, and interconnection to a standardized coupling 16 (shown in FIG. 1). The power source 21 is generally a battery, which provides a finite power supply for the operational circuitry. The oscillator 29 regulates internal device operation by controlling the timing of IMD operations. Other physical components are possible.

At a component level, the CPU 22 implements the device's core functionality, such as therapy delivery, and ancillary functionality, for instance, physiometric or environmental monitoring, through microprogrammed control. Program code is persistently stored in ROM 25 as firmware, which is either burned in at time of manufacture, or downloaded into the memory 24 during device interrogation. IMD operation is managed through supervisory program, such as a kernel, which ensures fault tolerant multithreaded processing (further described with reference to FIG. 4).

At runtime, the program code is loaded into the memory 24 from the ROM 25 and dynamic storage in the memory 24 for data is allocated. The memory 24 is controlled on behalf of the CPU 22 by the MMU 23. The transducer 26 provides signal conversion for exchanging recorded patient data and programming parameters with external interrogation devices, such as a programmer or patient-operable repeater, via RF or inductive telemetry. Finally, the therapy control circuitry 27 implements the device's core functionality, such as physiometric monitoring and therapy delivery. Other operational core or ancillary functionality is possible.

Fault Tolerance

Operationally, an IMD is more akin to an embedded controller than a general purpose computing device, such as a personal computer or programmable mobile telephone. An IMD operates in real time. Asynchronous events are processed as interrupt-driven requests, for instance, the charging of capacitors preparatory to therapy delivery or the receipt of incoming telemetry. On the other hand, therapy provisioning functionality, such as the endocardial delivery of electrical stimuli, operates on a tightly controlled timeline. Consequently, periodic functions on a controlled timeline, particularly for therapy-related purposes, must continue to operate with minimal interruption from asynchronous events and automatic device recovery must occur when appropriate in view of detected faults so as to avoid total loss of device function.

Figure 3:
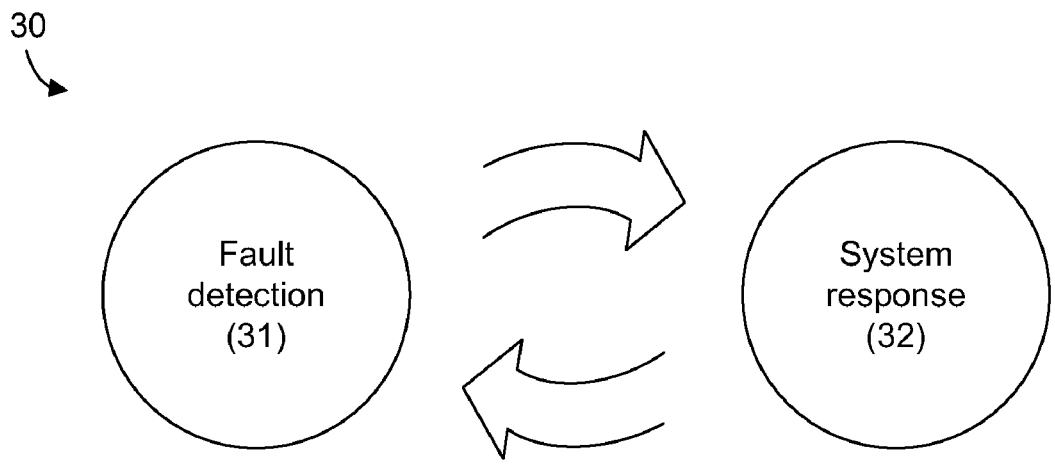
FIG. 3 is a process flow diagram showing fault tolerant operation in an implantable medical device.

Following implant, an IMD runs autonomously and virtually unattended, except when interfaced with an external interrogation device. As a result, an IMD must be self-reliant and able to automatically recover from faults occurring during operation. FIG. 3 is a process flow diagram showing fault tolerant operation 30 in an implantable medical device. Fault tolerant operation basically requires an ability to detect faults (operation 31) and respond automatically and in a timely and appropriate manner (operation 32). A typical response would be to reset or reboot the IMD, such as described in commonly-assigned U.S. Patent Publication No. 2006/0253163, filed Nov. 6, 2006, pending, the disclosure of which is incorporated by reference, although still other manners of response is possible.

Logical Components

Figure 4:
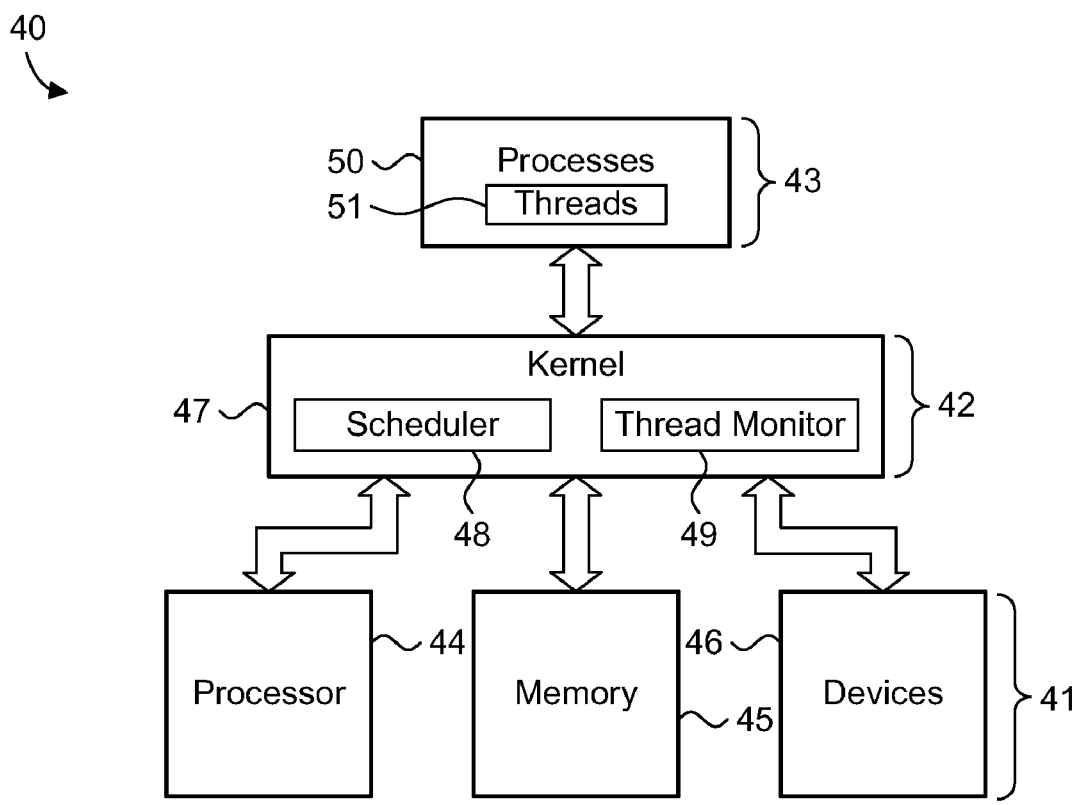
FIG. 4 is a functional block diagram showing the logical architecture of an implantable medical device, in accordance with one embodiment.

The processes, kernel, and physical components constitute the logical architecture of an IMD. FIG. 4 is a functional block diagram showing the logical architecture 40 of an implantable medical device, in accordance with one embodiment. A kernel ensures fault tolerant processing by monitoring concurrently executing threads subject to temporal and spatial constraints.

The hardware and software components can be logically modeled in three layers, including a hardware layer 41, operating system layer 42, and application software layer 43. The operating system layer 42 manages the hardware resources via a kernel 47 in response to control requests received from processes 50 in the application software layer 43. The hardware resources include execution on the processor 44, read and write requests to the memory 45, and input and output to devices 46, such as the transducer circuitry 26 and therapy control circuitry 27. Other hardware layer components are possible. For instance, the kernel 47 in the operating system layer 42 could use hardware timers to control the execution of the processes 50 in the application software layer 43.

The IMD must run in a self-reliant fashion, which includes automatically detecting fault conditions and taking appropriate corrective action, such as device reset, when necessary. Fault tolerance is provided through a thread monitor 49, which operates as part of the kernel 47, along with a process scheduler 48. The thread monitor 49 monitors individual executing threads. A watchdog timer can also be included and is preferably serviced by the kernel 47 as the lowest priority task thread to ensure system responsiveness.

At runtime, an executing process 50 may fork into a plurality of simultaneously executing threads of execution 51, which may share system resources, such as memory 45. The scheduler 48 divides processing time between the threads 51 through context switching. Threads 51 within the same process 50 share the same address space, which enables efficient data exchange between the threads, yet raises the risk of data corruption and cross thread execution. Temporal and spatial constraints are assigned to each of the threads. The constraints can be assigned at compile time or runtime and are specific to a thread or class of threads. The thread monitor 49 applies the constraints against the executing threads to identify fault conditions, as further described below beginning with reference to FIG. 5.

In a further embodiment, behavioral operations are executed in separate process partitions, which execute each process in separate address space and separate time, to ensure continuity of IMD functionality, particularly life sustaining therapy, such as described in commonly-assigned U.S. Provisional Patent application, Ser. No. 61/042,551, filed Apr. 4, 2008, the disclosure of which is incorporated by reference. Separation of process partitions is provided through a high integrity kernel, which provides an operating system that executes over the physical component of the IMD.

Fault Tolerant Processing

Figure 5:
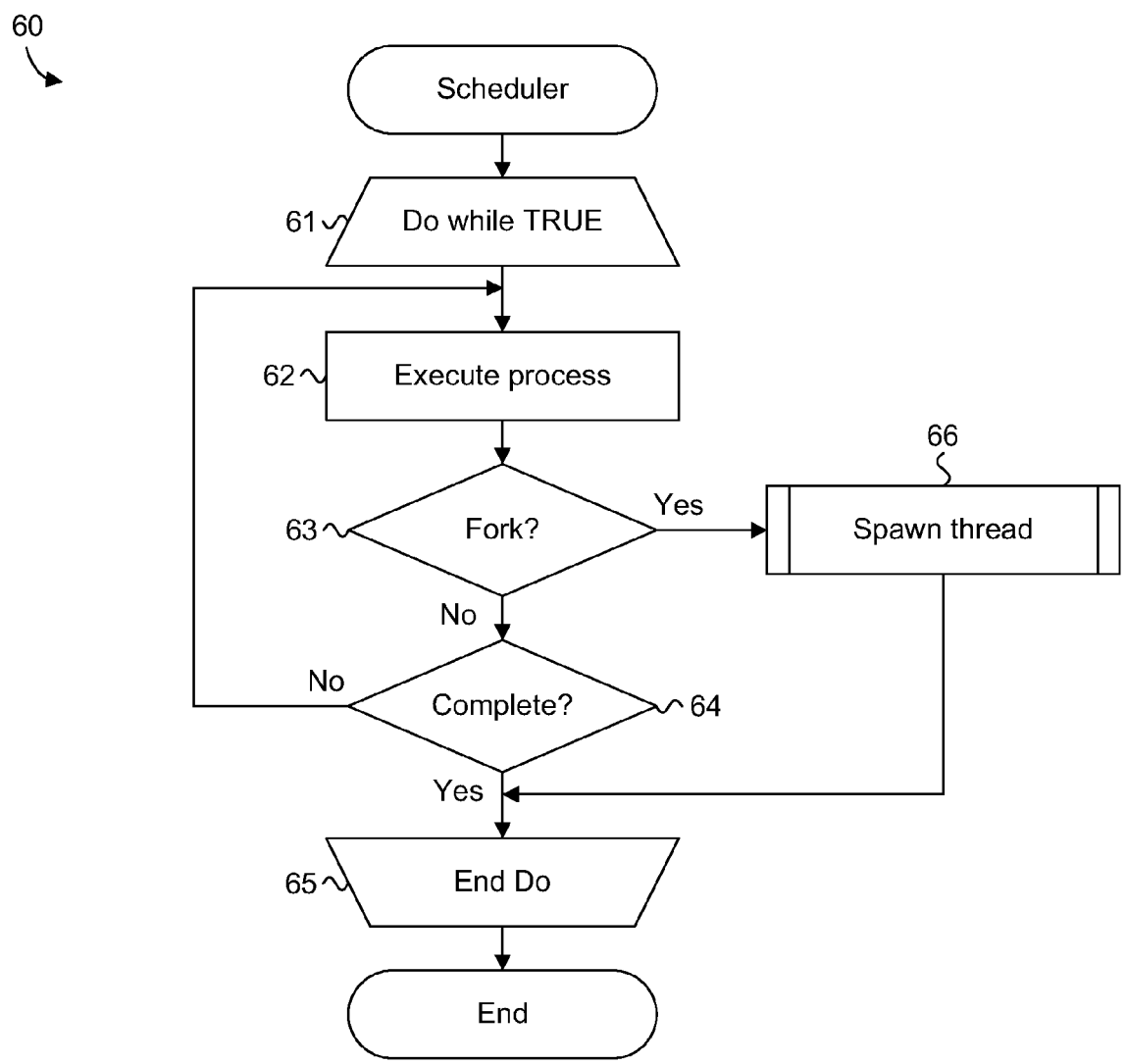
FIG. 5 is a flow diagram showing a method for providing fault tolerant processing in an implantable medical device, in accordance with one embodiment.

A kernel ensures fault tolerant processing by monitoring concurrently executing threads subject to temporal and spatial constraints. FIG. 5 is a flow diagram showing a method 60 for providing fault tolerant processing in an implantable medical device, in accordance with one embodiment. The method is performed as a series of process steps by an IMD. For simplicity, interrupt and error handling as relating to a single non-threading process are omitted.

An execution thread 51 is contained within an executing process 40 and is created as part of process scheduling. During each scheduling iteration (steps 61-66), one or more processes may begin execution (step 62). During execution, a process can request that execution "fork" (step 63), that is, be split or "spawned" into a plurality of simultaneously executing threads of execution (step 66), as further described below with reference to FIG. 6. Otherwise, the process continues execution through completion (step 64). Process scheduling terminates upon completion of the last process.

Thread Spawning

Figure 6:
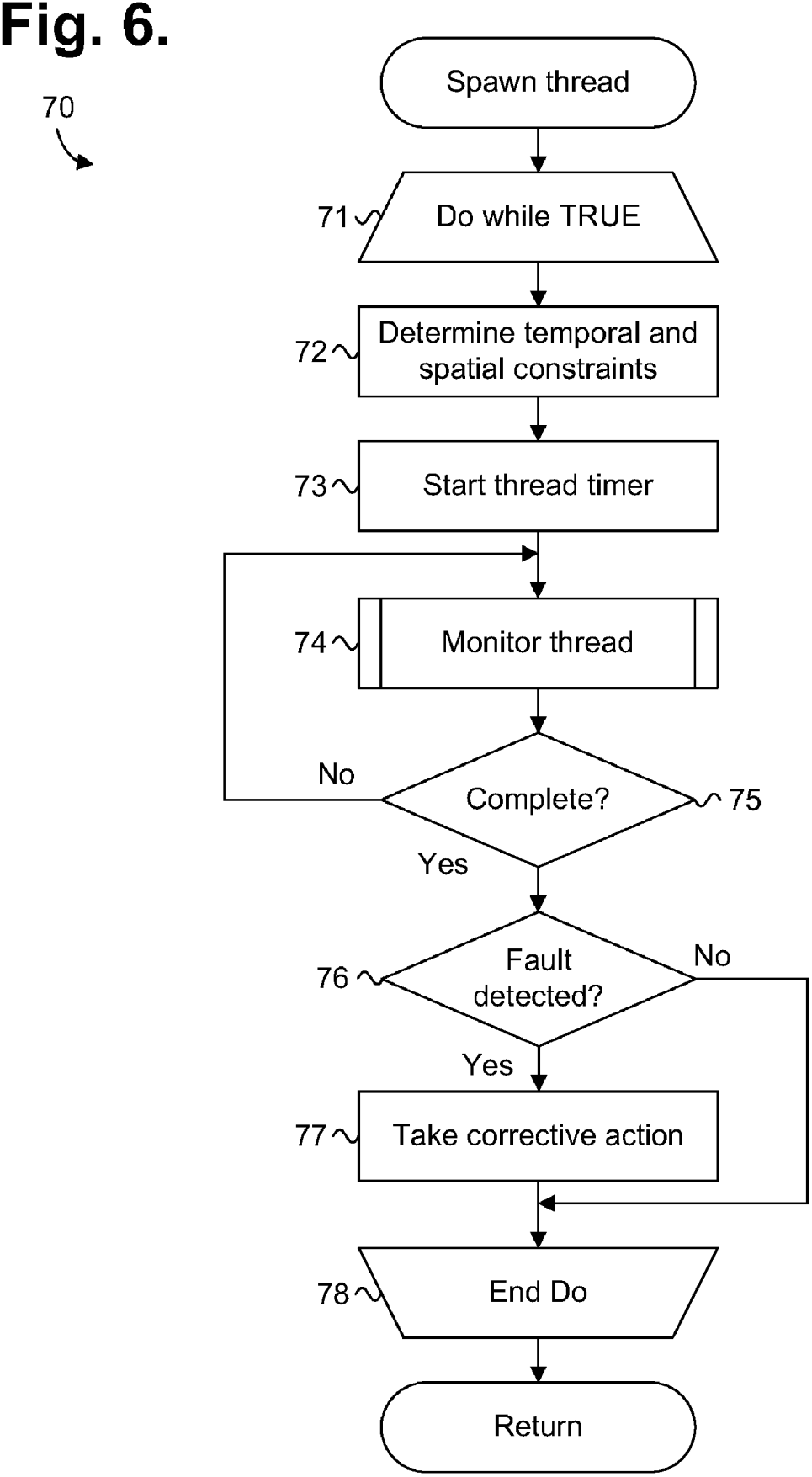
FIG. 6 is a flow diagram showing a routine for spawning an execution thread for use with the method of FIG. 5.

By virtue of being spawned from an already-executing process, a child execution thread is able to inherit state from the parent execution thread and operate on shared memory without requiring a separate address space. However, the lack of separate address space also introduces the risk of thread-specific runtime errors, such as cross thread execution. FIG. 6 is a flow diagram showing a routine 70 for spawning an execution thread for use with the method of FIG. 5. The routine introduces execution constraints, which can be used by the thread monitor in identifying a thread-related fault condition.

During each thread scheduling iteration (steps 71-76), temporal and spatial constraints for each thread are determined (step 72). The constraints are preferably assigned at compile time, but could be assigned dynamically at runtime. The temporal constraint is a maximum time period over which the thread is permitted to execute. The spatial constraint is a unique thread identifier (ID) is assigned to each thread. A thread timer is started (step 73) and the thread execution and monitoring is initiated (step 74), as further described below with reference to FIG. 7. The thread continues execution through completion (step 75). If a fault was detected by the thread monitor (step 76), corrective action is taken by an exception handler or similar construct as appropriate (step 77), which can include device reset or reboot, or other manner of corrective action to recover device operation. Thread scheduling terminates upon completion of the last execution thread.

Thread Monitoring

Figure 7:
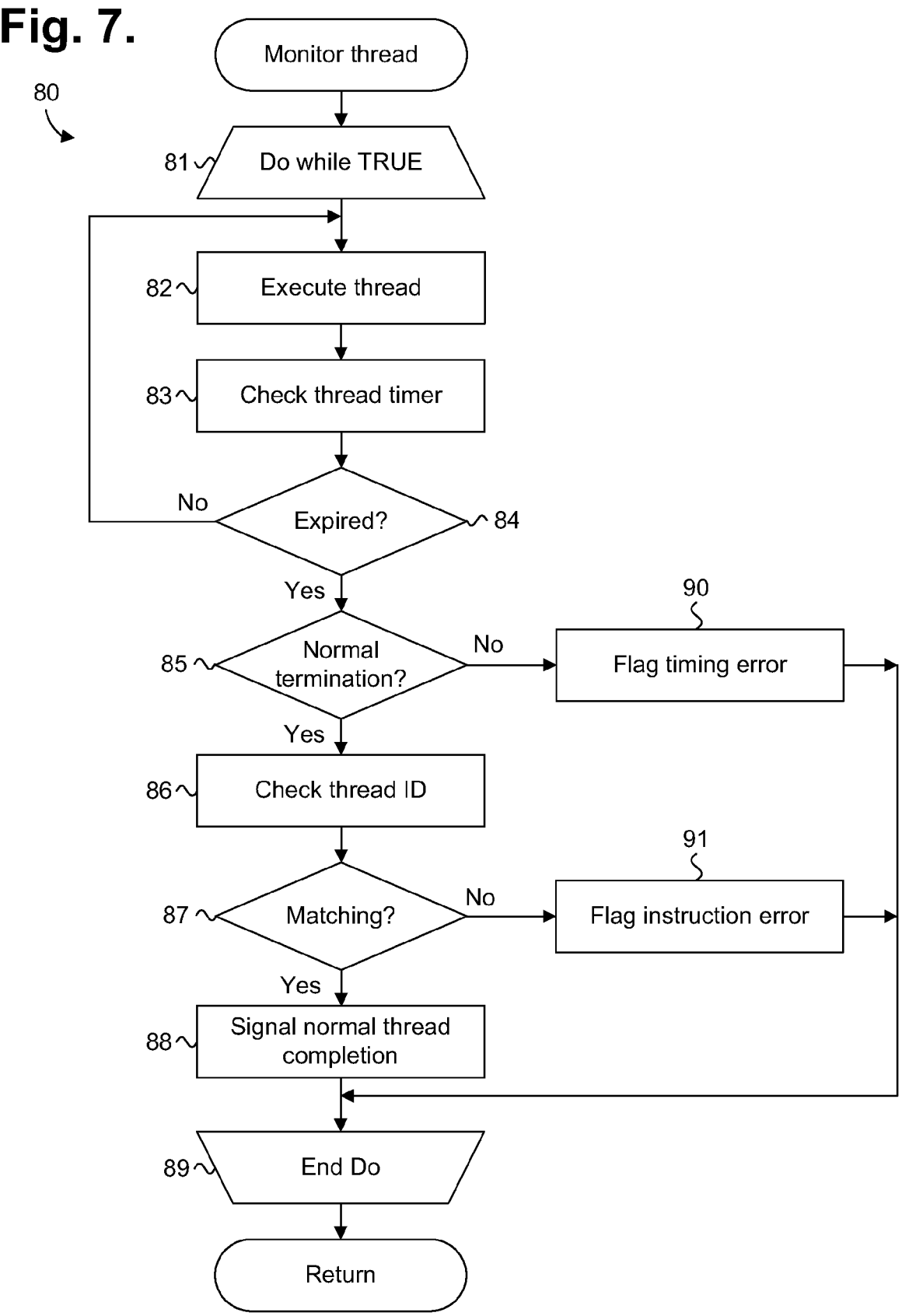
FIG. 7 is a flow diagram showing a routine for monitoring an execution thread for use with the routine of FIG. 6.

Thread monitoring ensures compliance with the temporal and spatial constraints assigned to each executing thread. FIG. 7 is a flow diagram showing a routine 80 for monitoring an execution thread for use with the routine of FIG. 6. The routine focuses on identifying faults particular to threads.

During each thread monitoring iteration (steps 81-89), execution of each thread is begun (step 82) and the corresponding thread timer is periodically checked (step 83). Thread execution is allowed to proceed until the thread timer expires (step 84). If, upon the expiry of the thread timer, the thread is still executing, that is, has not terminated normally within the expected maximum time period (step 85), a thread timing error is flagged (step 90). Flagging a thread timing error ensures against unbounded errant execution. Other thread timing errors, faults, or exception conditions are possible. If the thread has terminated normally (step 85), the thread identifier known to the executing thread is checked against the unique thread identifier previously assigned (step 86). If failing to match (step 87), a thread instruction error is flagged (step 91). Other thread instruction errors, faults, or exception conditions are possible. Otherwise, matching thread identifiers signal normal thread completion (step 88). Thread monitoring terminates upon completion of the thread.

In a further embodiment, the thread monitor is applicable to a hardware state machine that uses dispatchable threads instead of a processor executing programmatic instructions. For example, in a further embodiment, the thread monitor can be implemented in a hardware state machine, on a processor executing programmatic instructions, or a combination of both. Each dispatchable thread would be assigned temporal and spatial constraints, which respectively guaranteed completion with a finite time and memory resources. The thread monitor then ensures that each dispatchable thread was bounded in function in time and space. A response, such as flagging, can be issued upon violation of either of the constraints by one such execution thread, which can lead to corrective action, such as device reset or reboot.

While the invention has been particularly shown and described as referenced to the embodiments thereof, those skilled in the art will understand that the foregoing and other changes in form and detail may be made therein without departing from the spirit and scope of the invention. It will also be appreciated that flow diagrams are provided herein by way of illustration and should not be viewed as limiting. In some embodiments steps in flow diagrams may be executed concurrently or in a different order than depicted.

What is claimed is:

1. A system for providing fault tolerant processing in an implantable medical device, comprising:
    an implantable medical device comprising a processor and memory store, the processor and memory store configured to execute a plurality of threads;
    temporal and spatial constraints assigned to one or more of the threads, wherein the temporal and spatial constraints are applicable to individual threads or classes of threads; and
    a kernel, comprising:
    a scheduler configured to divide processing time among the plurality of threads; and
    a thread monitor configured to monitor execution of each of the threads for which temporal and spatial constraints are assigned, wherein the spatial constraints comprise a unique thread identifier assigned to individual threads or classes of threads prior to execution, wherein the thread monitor compares the unique thread identifier provided by a completed thread against a stored thread identifier, wherein mismatch of the completed thread identifier and the stored thread identifier indicates a violation of the spatial constraint, and wherein the thread monitor is further configured to issue a response upon violation of either of the temporal and spatial constraints by individual threads or classes of threads.

2. The system of claim 1, wherein the temporal constraints comprise a maximum allowable execution time for each of the plurality of threads.

3. The system of claim 2, wherein the thread monitor further comprises a timer configured to expire at the maximum allowable execution time for execution of each of the plurality of threads.

4. The system of claim 1, wherein the kernel further comprises an exception handler configured to take corrective action when a response is issued.

5. The system of claim 1, further comprising a watch dog timer, the kernel configured to service the watch dog timer using a lowest priority thread.

6. The system of claim 1, wherein the temporal and spatial constraints are assigned to one or more threads at compile time.

7. The system of claim 1, wherein the temporal and spatial constraints are uniquely assigned to individual threads.

8. The system of claim 1, wherein the temporal and spatial constraints are uniquely assigned to a class of threads.

9. The system of claim 1, wherein the implantable medical device is selected from the group consisting of: a pacemaker, implantable cardioverter-defibrillator, biventricular pacemaker, implantable sensor, neural stimulator, and implantable monitor.

10. A method for providing fault tolerant processing in an implantable medical device, comprising:
    providing a processor and memory store in an implantable medical device that are configured to execute a plurality of threads;
    defining temporal and spatial constraints for one or more of the plurality of threads, the temporal and spatial constraints applicable to individual threads or classes of threads;
    dividing processing time between the plurality of threads;
    monitoring thread execution and memory usage of each individual thread or class of threads against the temporal and spatial constraints assigned to the individual thread or class of threads, wherein the spatial constraints comprise a unique thread identifier assigned to individual threads or classes of threads prior to execution;
    comparing the unique thread identifier provided by a completed thread against a stored thread identifier, wherein mismatch of the completed thread identifier and the stored thread identifier indicates a violation of the spatial constraint; and
    issuing a response upon violation of either of the corresponding defined temporal and spatial constraints by the individual thread or class of threads.

11. The method of claim 10, further comprising:
    timing each thread execution; and
    flagging thread execution upon expiry of a timer absent normal completion of the thread execution.

12. The method of claim 10, further comprising:
    taking corrective action upon fault detection; and
    recovering operation of the implantable medical device.

13. The method of claim 10, further comprising:
    providing a watch dog timer, wherein a kernel is configured to service the watch dog timer using a lowest priority thread.

14. The method of claim 10, further comprising:
    specifying the temporal and spatial constraints for one or more threads at compile time.

15. The method of claim 10, further comprising assigning the temporal and spatial constraints to an individual thread.

16. The method of claim 10, further comprising assigning the temporal and spatial constraints to a class of threads.

17. The method of claim 10, wherein the implantable medical device is selected from the group consisting of: a pacemaker, implantable cardioverter-defibrillator, biventricular pacemaker, implantable sensor, neural stimulator, and implantable monitor.

\* \* \* \* \*